No. 633,296. Patented Sept. 19, 1899.
A. H. SMITH.
STREET SWEEPER.
(Application filed Aug. 19, 1896. Renewed July 11, 1899.)
(No Model.) 2 Sheets—Sheet 1.
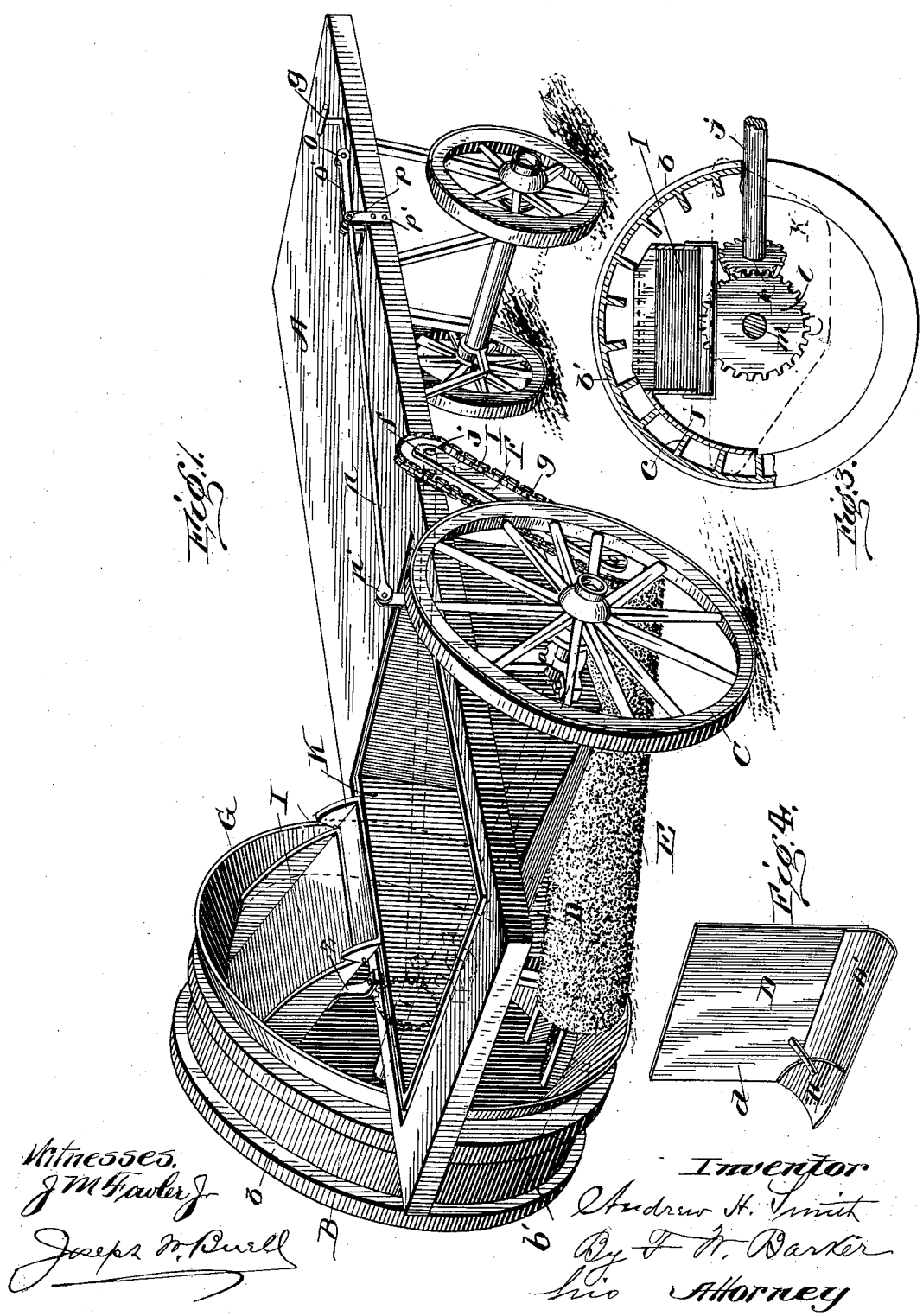
Witnesses.
J M Fowler Jr
Joseph W Burl
Inventor
Andrew H. Smith
By F. W. Barker
his Attorney

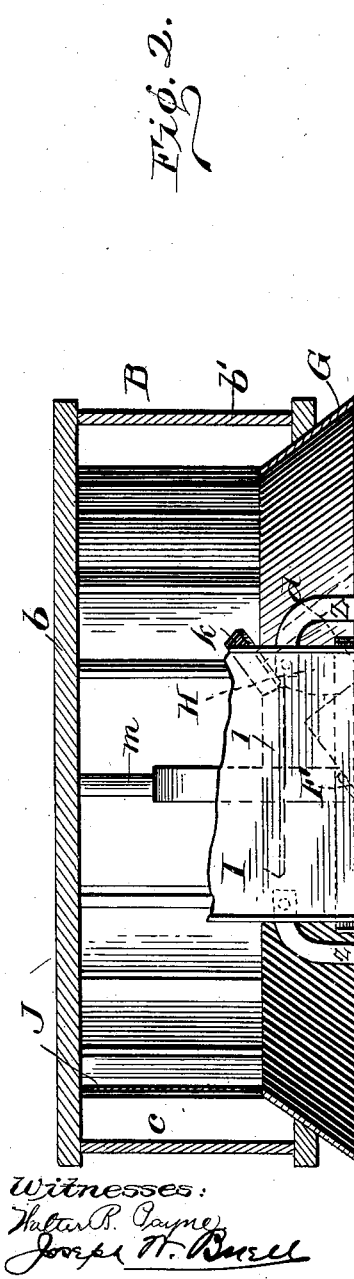

UNITED STATES PATENT OFFICE.

ANDREW H. SMITH, OF NEW YORK, N. Y.

STREET-SWEEPER.

SPECIFICATION forming part of Letters Patent No. 633,296, dated September 19, 1899.

Application filed August 19, 1896. Renewed July 11, 1899. Serial No. 723,501. (No model.)

*To all whom it may concern:*

Be it known that I, ANDREW H. SMITH, a citizen of the United States, residing at New York, in the county and State of New York, have invented certain new and useful Improvements in Street-Sweeping Machines, of which the following is a full, clear, and exact specification.

This invention relates to street-sweeping machines; and my improvements include the provision of an enlarged hollow wheel containing buckets, an apron arranged in advance of said wheel, and a brush rotatably supported in position to sweep dirt, &c., into said hollow wheel, the buckets whereof deposit the sweepings when elevated by the rotation of the wheel into a chute and thence to the interior of a cart. The hollow wheel is provided with an annular flexible flange which extends beyond the wheel-periphery and by hugging the road-surface closely enables the smallest particles of dirt, &c., to be swept into the wheel. The cart is arranged to be tipped to dump its contents by lever mechanism which is operated by a handle placed adjacent to the driver's seat.

In the accompanying drawings, Figure 1 is a view in perspective of my apparatus. Fig. 2 is a top plan view showing the bucketed wheel in horizontal section, while Fig. 3 is a detail showing the bucketed wheel in vertical longitudinal cross-section, and Fig. 4 represents a detail view of the apron.

In said figures, A indicates the frame of the apparatus, from which frame hangers $a$ depend and support the wheels B C. Said wheel B consists of a hollow body which is composed of the outer circular wall $b$ and the inwardly-projecting circular flange $b'$. Buckets are provided within said hollow wheel by placing strips or pieces $c$ transversely upon the inner surface of flange $b'$ at intervals around its circumference.

D indicates an apron placed diagonally beneath the frame, having a rubber or other flexible lower edge D', filling the space between said frame and the road-surface, one side edge $d$ being conterminous with the open side of wheel B, and a circular brush E of approximately the same length as the width of said apron is arranged rearward of and parallel with said apron. Said brush E is rotatably mounted in trailers F, which are pivotally connected to the frame at $f$, and the brush is turned by the sprocket-chain $g$, which passes over sprocket-wheel $i$ on a rod $j$, the said rod $j$ being journaled beneath frame A and having a beveled pinion $k$ on its opposite end, which meshes and is rotated by a gear-wheel $l$, secured to the axle $m$ of wheel B.

An important feature of the present invention consists of the frustum-shaped flexible receiving edge G of wheel B, which edging is secured to the peripheral edge of flange $b'$ and forms a flared mouth for the hollow wheel B. The extreme diameter of edging G is preferably somewhat greater than that of wheel B, so that the outer circle of said edging at the point of contact with the road-surface is slightly flattened by such contact.

H indicates a substantially triangularly-shaped piece of rubber or other flexible material which is secured to the apron D at its lower corner adjacent to wheel B, covering the opening that would otherwise exist between the edging G, the road-surface, and the apron.

One end of the diagonally-arranged brush E extends over edging G and part way within the hollow of wheel B. Its action therefore in sweeping is to deposit the sweepings over flexible edging G into the buckets formed in wheel B. The apron D and corner-piece H prevent the sweepings from escaping.

I indicates a chute which is pivotally connected to a shield J, which latter is supported upon the frame in position beneath the upper portion of the interior of wheel B by the bolted rods $z$, the function of said shield being to prevent the sweepings collected within the buckets from falling before the same can enter the chute as the buckets are brought to the upper position by the rotation of wheel B. The lower end of chute I abuts over a cart K and serves to convey the contents of said buckets to said cart. Cart K is pivotally supported between wheels B and C and is arranged to be tipped backward to dump its contents. Said cart K is retained in its loaded condition by meams of lever $n$, which is pivoted at $n'$ to the cart and is pivoted at

*o* to a toggle-arm *o'*, which toggle-arm is pivotally secured at *p* to a support *p'* on the frame A.

*q* is the handle of lever *n*, which handle when pulled upwardly and thrust back dumps the cart.

In the operation of the machine the brush, which should extend at one end over the flexible flange G, sweeps all dust and loose particles into the wheel B. The flexible flange is preferably of a little greater diameter than the wheel, and thus its outer edge is turned and caused to lay flat upon the road at the point of contact, thereby enabling the brush to sweep all dust, dirt, &c., into the wheel B over said flange G without leaving even the smallest windrow. The function of the triangularly-shaped flexible piece H is almost equally important, since it prevents the escape of the sweepings at the aperture which would otherwise exist between the apron D and flange G. The wheel B by its buckets elevates the sweepings in its rotation, and the shield J prevents said sweepings from falling by gravity until the same are brought over the chute I, which latter directs the sweepings into the cart.

Having now described my invention, I declare that what I claim is—

1. A street-sweeping machine consisting of a frame, a hollow wheel journaled thereto, said wheel containing buckets and an outwardly-flaring flexible flange arranged at the open side of said wheel, a brush to sweep particles into said wheel, and means for conveying the sweepings from said wheel into an adjacent receptacle, substantially as set forth.

2. A hollow wheel containing means for elevating particles, and an outwardly-flaring, flexible flange arranged at the open side of said wheel, substantially as set forth.

3. In a street-sweeping machine, a frame, a hollow bucketed wheel journaled thereto having an outwardly-flaring flexible flange arranged at the open side of said wheel, a brush mounted in trailers depending from the frame, said brush being arranged to sweep particles into the said wheel, and an apron in advance of said brush, having one side edge conterminous with said wheel, to confine the sweepings; together with a flexible, triangular piece connected to said apron, to cover the space bounded by the wheel, apron, and roadway, substantially as set forth.

4. In a street-sweeping machine, in combination, a frame, a hollow wheel journaled thereto, said wheel containing buckets to receive sweepings and having an outwardly-flaring flexible flange arranged at the open side of said wheel, a receptacle supported by the frame adjacent to said hollow wheel, and a chute to convey sweepings from the interior of said wheel to said receptacle, together with a shield arranged at either side of said chute, beneath the upper buckets, substantially as set forth.

In testimony that I claim the foregoing I have hereunto set my hand this 17th day of July, 1896.

ANDREW H. SMITH.

Witnesses:
DAVISON H. SMITH,
SAMUEL S. THORNELL.